Aug. 22, 1939.  E. P. SMITH  2,170,311
BOWL
Filed March 14, 1938
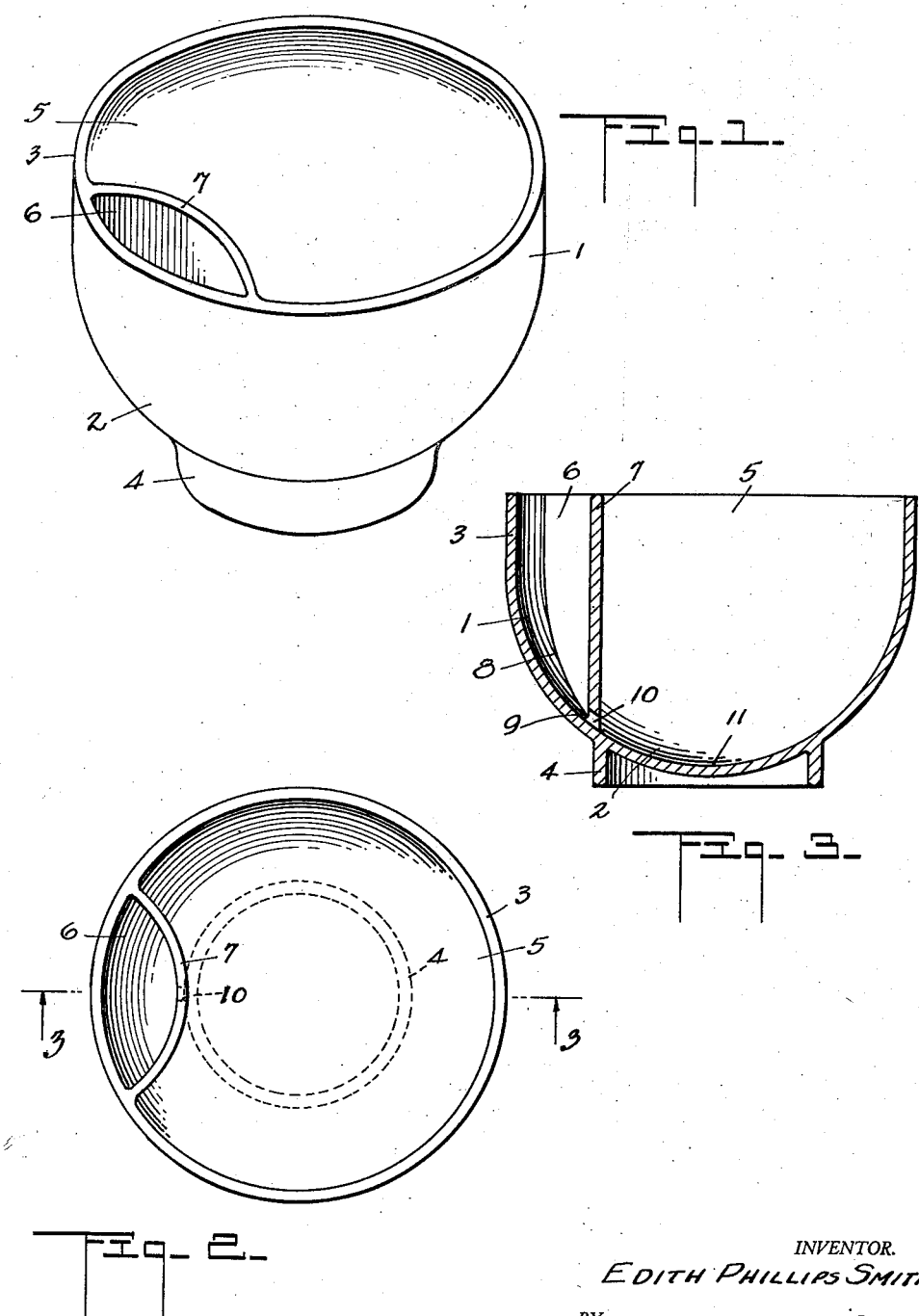
INVENTOR.
EDITH PHILLIPS SMITH.
BY Schapp & Cole
ATTORNEYS Patented Aug. 22, 1939

2,170,311

UNITED STATES PATENT OFFICE 2,170,311

BOWL

Edith Phillips Smith, Berkeley, Calif.

Application March 14, 1938, Serial No. 195,739

1 Claim. (Cl. 65—15)

The present invention relates to improvements in breakfast bowls and its principal object is to provide a breakfast bowl which permits cream to be introduced into breakfast foods without destroying their crispness, a characteristic which makes certain kinds of breakfast foods particularly appetizing.

At present it is the custom to serve certain breakfast foods in conventional bowls and to pour the cream or other liquid to be used on top of the breakfast food so that the cream trickles through the food, which causes the latter to absorb the cream and to become soggy.

In the present invention it is proposed to provide a bowl which is arranged in such a manner that the cream may be directly delivered to the bottom of the bowl without trickling through the breakfast food so that the latter retains its crispness. The user may dip his spoon down to the level of the cream and in lifting it will remove a spoon partly filled with cream and with a layer of dry and crisp breakfast food on top of the cream.

Further and other objects and advantages of my invention will appear as the specification proceeds.

The preferred form of my invention is illustrated in the accompanying drawing in which Figure 1 shows a perspective view of my breakfast bowl, Figure 2 a top plan view of the same, and Figure 3 a vertical section taken along line 3—3 of Figure 2.

While I have shown only the preferred form of my invention I wish to have it understood that various changes or modifications may be made within the scope of the claim hereto attached without departing from the spirit of the invention.

In its preferred form my bowl 1 has a rounded, concave bottom 2 which may be semi-spherical in form and has a rim 3 rising therefrom which latter is preferably cylindrical.

It should be understood that this form of bowl is more or less conventional and other forms may be substituted as long as they lend themselves to the application of the special features about to be described.

A cylindrical base 4 may be used to normally hold the bowl in upright position.

The bowl is divided into a major section 5 and a minor section 6 by means of a partition 7. The latter rises vertically from the ascending bottom of the bowl in the proximity of a portion of the rim of the bowl so as to separate the section or pocket 6 from the main body portion of the bowl.

In horizontal section the partition is reversely concave to that portion of the rim with which it cooperates in forming the pocket and the partition rises from the bottom at a point well spaced from the center of the bowl, as shown in the drawing.

Since the partition is vertical and the cooperating wall section of the bowl is curved, the bowl and the wall section intersect along a curved line 8, and the pocket formed is deepest at a point immediately adjacent the center of the partition, with the result that all parts of the pocket drain toward said point, which is indicated at 9.

At this point 9 the partition 7 is formed with an aperture 10 and since this aperture is still a considerable distance above the central bottom point 11 of the bowl, any liquid draining through the hole will gravitate toward the center of the bowl.

The manner of using my invention will be readily understood from the foregoing description. The crisp breakfast food is poured, usually from a commercial container, into the main compartment of the bowl.

The user then empties the cream into the pocket or minor compartment 6 and the latter drains completely from the pocket into the lower section of the bowl, entirely out of contact with the main part of the breakfast food.

The user may now dip his spoon into the bowl sufficiently deep to secure a portion of the cream and in lifting the spoon will remove a desired amount of the breakfast food which thus remains crisp until it reaches the mouth of the user.

The size of the aperture 10 should preferably be such that it somewhat retards the flow of the cream so that the latter would be fed into the bottom of the main compartment slowly and substantially in timed relation to the emptying of the bowl.

I claim:

A bowl of the character described having an annular rim section and a rounded bottom section merging thereinto and a vertical partition near a portion of the rim section and formed on a curve reverse to that of the bowl so as to form a special compartment, each part of which drains toward a central point, the partition having a hole at said point communicating with the main portion of the bowl.

EDITH PHILLIPS SMITH.